United States Patent [19]
Haeusler

[11] 3,891,143
[45] June 24, 1975

[54] ENCODING APPARATUS HAVING AN IMPROVED CODE PERMITTING ERROR READING AND ERROR DETECTION

[75] Inventor: Jochen Haeusler, Nurnberg-Laufamholz, Germany

[73] Assignee: Siemens Aktiengesellschaft, Munich, Germany

[22] Filed: Dec. 4, 1973

[21] Appl. No.: 421,683

[30] Foreign Application Priority Data
Dec. 27, 1972 Germany............................ 2263619

[52] U.S. Cl....235/61.7 R; 235/153 AE; 340/347 AD
[51] Int. Cl. ...... G06k 5/00; G06f 11/08; G08c 9/04
[58] Field of Search..........235/61.11 E, 61.11 D, 235/153 AE, 153 AM, 61.7 R; 340/347 AD

[56] References Cited
UNITED STATES PATENTS
2,909,769  10/1959  Spaulding..................... 340/347 AD
3,266,018  8/1966  Higgins........................ 340/347 AD
3,540,034  11/1970  Kawashima et al.......... 340/347 AD Primary Examiner—Daryl W. Cook
Attorney, Agent, or Firm—Kenyon and Kenyon Reilly Carr & Chapin

[57] ABSTRACT

An improved encoding arrangement which permits error free reading of a coded index carrier and detection of any errors in such readings in which the index carrier is coded in such a manner that the difference between any code and its inverse is equal to a constant. Means are shown for taking a direct and inverse reading from the index carrier and comparing their difference with a constant to ensure that the encoding system is operating properly.

4 Claims, 1 Drawing Figure

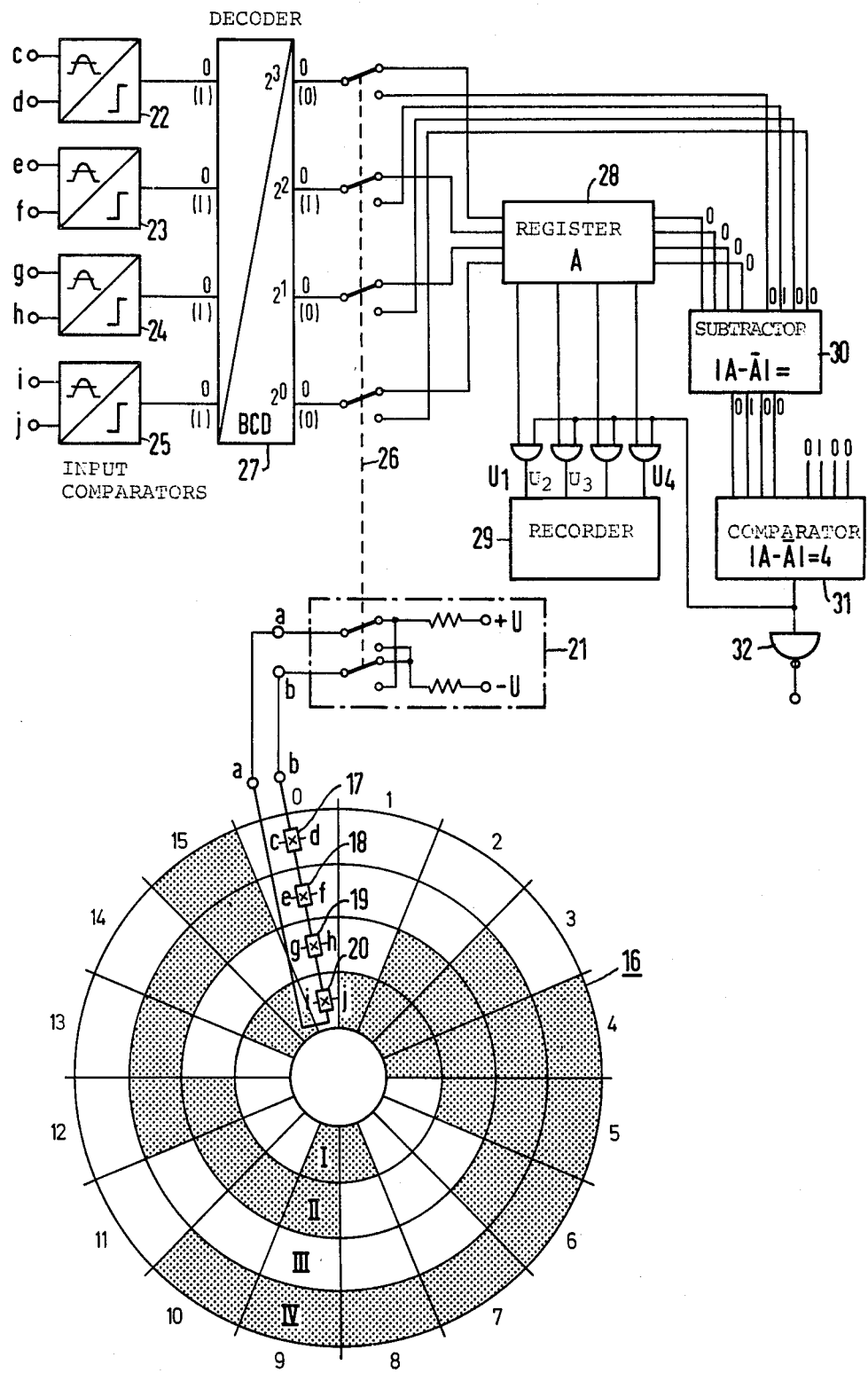

ENCODING APPARATUS HAVING AN IMPROVED CODE PERMITTING ERROR READING AND ERROR DETECTION

BACKGROUND OF THE INVENTION

This invention relates to encoders in general and more particularly to an improved encoder which includes means for error detection and provides error free operation.

It is well known that encoders are used with various devices which require calibration and/or supervision of a linear or angular position in the device. For example, weighing scales are known which include encoders which provide outputs indicating the scale position and thereby the weight upon the scale. Typically, such encoders comprise an index carrier having a plurality of code tracks with an equal plurality of stationary pickup elements arranged next to the tracks, which pick-up elements provide an output indicating the position of the index carrier. These values may then be used and further processed to provide a recorded weight or be displayed on a digital readout device.

In each case where such encoders are used, the pickup and transmission of the measured values must be done in a manner which ensures that the data provided is free from errors. For example, when using such a device in a weighing scale, it is essential that the value transmitted represents the true weight being sensed. This is particularly true where the measured value is transmitted to some sort of registering or data processing system. If an error is present, then the value must be prevented from getting into the system.

Various encoders have been developed which include a code thereon through which single errors can be recognized in evaluating a measurement step. One of these known as the Hamming distance code establishes such a criteria for the protection against single errors. Known codes of this nature are the "one of ten" code, the "two of seven" code, the "three of five" code and the "two of five" code. These codes, although useful, have the disadvantage that they are not single step codes. Thus, measures for syncronizing or digitizing must be taken. For example, an additional clock track must be provided if the detection of an improper transition is to be sensed.

Other methods of error free operation using single step codes and providing error detection have been developed. For example, French Pat. No. 1,417,750 teaches superimposing two weighing scales and taking the same weight value from each scale. At the end of the transmission path the two weight values are compared with each other and depending on the results of this comparision, further transmission of the data is either enabled or blocked. However, with a method such as this, two identical measuring pickups are required.

In another scale shown in German Auslegeshrift 1,549,265 an encoder is used which has an index carrier at the measuring element which can be read using a reading head. In this system, two reading heads arranged side-by-side at a constant displacement take readings from the same index carrier which reading correspond to the displacement thereof. The two measured values are then passed to a comparator unit which then checks the measurement values to detect a certain difference. With such an arrangement, stringent requirements are placed on the uniformity of graduation of the index carrier. In both of the above mentioned prior art methods, each of which compare the two values obtained to obtain their difference, a difference of one can be the result of a malfunction in the system or it can be a normal deviation from an ideal graduation or a change therefrom, which change is still within the system accuracy limits. Thus, unless large errors develop, it is not possible to know for sure whether the system is operating properly.

Thus, there is a need for improved encoders of this nature for use with scales and the like which will provide error free operation and will reliably provide an output indication when an error is detected.

SUMMARY OF THE INVENTION

The present invention provides such an encoder through the use of a special code which has as its primary characteristic the fact that the absolute value difference between a direct reading of the code and its inverse is equal to a constant. Means are provided to first read the code directly and then read its inverse, after which the two values are subtracted and the result compared with a predetermined constant. As long as the difference equals the constant, the system is operating properly. However, if the difference varies from the constant, an error is present in the system. Only when proper operation is indicated by the difference equalling the constant is the data allowed to be transferred on to the remainder of the system. The pickup elements will preferably be Hall effect generators which sense the presence of magnetic areas coded on the index carrier. In the preferred embodiment, the index carrier is a disk having a plurality of coded tracks thereon with a Hall effect generator located adjacent each track. The Hall effect generator has the advantage that simply by changing the polarity of its excitation voltage, both the direct and inverse readings may be obtained.

Since, in the present invention, both the direct and inverse readings are obtained by the same pickup elements from the same position on the index carrier, no additional accuracy requirements of any kind are placed on the system. In addition, in the present system the comparison made will detect not only single errors but also multiple errors which occur simultaneously and independently, a capability not present in many of the prior art systems.

As is well known with n tracks available for a code, $2^n$ numbers in binary notations can be generated. In accordance with the present invention only those of the $2^n$ possible combinations which furnish single step changes may be used. Of these, only those which are structured such that they have negated all states after $n$ steps are of interest. Codes structured in this manner furnish an absolute value of the difference of the number corresponding to the bit pattern and its inverse, which absolute value is equal to the value n. Depending on the magnitude of n selected, there are some codes in which all $2^n$ bit patterns may be used. In others, only a portion of the $2^n$ bit patterns are possible.

BRIEF DESCRIPTION OF THE DRAWINGS

The single FIGURE is a block diagram of a preferred embodiment of the present invention.

DETAILED DESCRIPTION OF THE PREFERRED EMBODIMENT

Two of the possible coding schemes that may be used are set out below. In Table 1 the scheme for use where $n$ equals 4 and which permits all $2^n$ combinations is set out. In Table 2 which is for $n = 5$, only 20 of the 32 possible bit patterns may be used.

Table 1

|  | A | $\bar{A}$ | $\|A - \bar{A}\|$ |
|---|---|---|---|
| $n = 4$ : | 0 = 0000 | 4 = 1111 | 4 |
|  | 1 = 0001 | 5 = 1110 | 4 |
|  | 2 = 0011 | 6 = 1100 | 4 |
|  | 3 = 0111 | 7 = 1000 | 4 |
|  | 4 = 1111 | 0 = 0000 | 4 |
|  | 5 = 1110 | 1 = 0001 | 4 |
|  | 6 = 1100 | 2 = 0011 | 4 |
|  | 7 = 1000 | 3 = 0111 | 4 |
|  | 8 = 1001 | 12 = 0110 | 4 |
|  | 9 = 1011 | 13 = 0100 | 4 |
|  | 10 = 1010 | 14 = 0101 | 4 |
|  | 11 = 0010 | 15 = 1101 | 4 |
|  | 12 = 0110 | 8 = 1001 | 4 |
|  | 13 = 0100 | 9 = 1011 | 4 |
|  | 14 = 0101 | 10 = 1010 | 4 |
|  | 15 = 1101 | 11 = 0010 | 4 |

Table 2

|  | A | $\bar{A}$ | $\|A - \bar{A}\|$ |
|---|---|---|---|
| $n = 5$ | 0 = 00000 | 5 = 11111 | 5 |
|  | 1 = 00001 | 6 = 11110 | 5 |
|  | 2 = 00011 | 7 = 11100 | 5 |
|  | 3 = 00111 | 8 = 11000 | 5 |
|  | 4 = 01111 | 9 = 10000 | 5 |
|  | 5 = 11111 | 0 = 00000 | 5 |
|  | 6 = 11110 | 1 = 00001 | 5 |
|  | 7 = 11100 | 2 = 00011 | 5 |
|  | 8 = 11000 | 3 = 00111 | 5 |
|  | 9 = 10000 | 4 = 01111 | 5 |
|  | 10 = 10001 | 15 = 01110 | 5 |
|  | 11 = 10011 | 16 = 01100 | 5 |
|  | 12 = 10111 | 17 = 01000 | 5 |
|  | 13 = 10110 | 18 = 01001 | 5 |
|  | 14 = 00110 | 19 = 11001 | 5 |
|  | 15 = 01110 | 10 = 10001 | 5 |
|  | 16 = 01100 | 11 = 10011 | 5 |
|  | 17 = 01000 | 12 = 10111 | 5 |
|  | 18 = 01001 | 13 = 10110 | 5 |
|  | 19 = 11001 | 14 = 00110 | 5 |

In each case in the above tables, the direct value A indicating the binary code and the decimal number which it represents and $\bar{A}$ the inverted binary code and the decimal number which it represents along with the absolute value of their difference is indicated on the table. In each case it will be noted that each change is a single step change and that in every case the absolute value of the direct value and its inverse is equal to a constant. In regard to Table 2 which only permits the use of 20 of the 32 bit patterns particular attention should be called to its usefulness in systems which use a decimal structure i.e., wherein only the numbers from 0 to 9 are encoded. Thus, a system using the code of Table 2 is capable of encoding from 0 to 20 in decimal.

FIG. 1 illustrates a system using the code of Table 1. A disk shape index carrier 16 is provided having thereon four tracks labelled I, II, III, and IV. The areas shown as shaded are magnetically coded on the disk in conventional fashion. Along a radial of the disk in positions adjacent each of the four tracks are placed pickup elements designated as 17, 18, 19 and 20. Preferably, these will be Hall effect generators and are provided with a control current from the terminals designated a and b. As illustrated, the Hall effect generators may be connected in series. The respective Hall voltages of the generators 17, 18, 19 and 20 are output at terminal cd, ef, gh and ij respectively and are provided as inputs to the respective input comparators 22, 23, 24 and 25. These comparators may comprise operational amplifiers configured as snap action amplifiers and having the characteristic illustrated by the blocks. That is, the output of the amplifier will be saturated in one direction for a voltage above a certain predetermined level and either at O or saturated in the other direction for a voltage below that level. Such arrangements are well known in the art and further information as to such arrangement can be obtained from application notes of the various operational amplifier manufacturers such as Burr-Brown, National Semiconductor, Fairchild and so on.

As is well known, the Hall effect generator will have a voltage at one level when a magnetic area is sensed and at another level when no such area is sensed. In response thereto, the input comparators 22 through 25 will output corresponding signals which in digital notation will either be "1"s or "O"s. In the arrangement with the switch 26 in the position shown, a positive voltage $+ U$ is being provided to the terminal $a$ and a negative voltage $- U$ to the terminal $b$. In this state, the Hall effect voltage outputs will be such as to directly represent the code on the disk. Thus, in the position shown which represents 0000, i.e., no Hall effect generator is opposite a magnetic area, all Hall effect voltages will be low and the corresponding comparator outputs will all be at a digital O. The outputs of the input comparators 22 through 25 are provided into a decoder 27 which converts the code of Table 1 into a binary coded decimal [BCD] code. The design of such an encoder using available gating logic is well known to those skilled in the art. With the switch 26 in the position shown, the output of decoder 27 is provided into a register 28. This output is BCD representation of the decimal value A given on Table 1.

Movement of the multipole switch 26 to the position not shown will result in the terminal $a$ having a negative voltage thereon and the termibal $b$ having a positive voltage thereon. The result at the Hall effect generators 17 through 20 is that their outputs will be reversed and will now all be high. Thus, at the comparators 22 through 25 the outputs will now all become 1. In the code of Table 1 and 1 represents the number four. Thus, when decoded in decoder 27 all will result in a 1 output, in the binary coded decimal notation, on the $2^2$ line of decoder 27. With the switches in the other position, these outputs will be provided to a subtractor 30 as shown. Subtractor 30 has at its second input the output of register 28. As noted above, register 28 and all O as inputs and will have all O as outputs. Subtractor 30 will comprise conventional digital adders or subtractors arranged in well known fashion. It will find the absolute value of a difference of the two inputs and provide the output as shown. In the present example where $n = 4$ each output from the subtractor representing the absolute difference of A and $\bar{A}$ must equal four as indicated. The subtractor output is compared in comparator 31 with a preset input of 4 in the BCD notation. Comparator 4 may comprise a gating comparison arrangement constructed in well known fashion. For example the $2^2$ bits can be provided as inputs to an AND gate with the remaining bits being inputs to NOR gates the outputs of each of these gates being provided to a further AND gate. In this manner, only if both of the $2^2$ bits are 1 and all the remaining bits O will the final AND gate have an output of 1. If the output of 1 does appear at the output of comparator 31, it will enable the AND gates U1, U2, U3 and U4 allowing the output of register 28, representing the measured value to be input to a recorder 29. Recorder 29 although indicated as a recorder may also be a digital readout. Therein, the BCD number from register 28 may be decoded into a decimal number in well known fashion and printed or displayed in decimal form.

When used in a scale for example, the disk 16 will be mechanically coupled to the scale so that linear displacement of the scale will result in rotation of the disk with the Hall effect generators 17 through 20 remaining fixed. Once the scale has settled, whatever displacement is being sensed will be loaded into register A. At that point the switch 26 may be thrown to provide the inverse of the displacement as a second input to subtractor 30 whereupon, if the system is operating, properly, an output from comparator 31 will result causing the measure value to be gated into the recorder 29 and displayed and/or recorder. A NOR gate invertor 32 is also provided at the output of comparator 31 and will provide an output of 1 if the comparator output is O indicating a malfunction. The output of gate 32 may then be used in an error earning system to inform the operator that the system is not working properly.

It will be recognized that although the above explanation contemplates a manual activation of the switch 26 when a reading is desired, that various automatic means for making continuous readings may be used. For example, means may be coupled to the input comparators to detect each output therefrom indicating a change in reading and this then used to initiate the switching of the switch 26 to obtain a reading. In addition, further enabling and disabling logic may be used to prevent the inputs to recorder 29 and the output of gate 32 at times when measurements are not being taken. These and other modifications may be made without departing from the spirit of the invention which is intended to be limited solely by the appended claims.

What is claimed is:

1. Improved encoding apparatus which provides for error free reading and error detecting comprising:
   a. an index carrier having a plurality of coded tracks thereon;
   b. a plurality of pick-up elements arranged in a row adjacent said tracks;
   c. means for storing a representation of the reading detected by said pick up elements;
   d. means for obtaining the inverse of said reading;
   e. means for determining the absolute value of the difference between said reading and said inverse;
   f. means for comparing said absolute value with a constant value equal to the number of said plurality of tracks and to provide an output indicating whether or not said absolute value is equal to said constant value; and
   g. the code on said index carrier being such that for each position the absolute value of the difference between the number represented by a direct reading of said code and its inverse is equal to said constant.

2. The invention according to claim 1 in combination with a weighing scale.

3. The invention according to claim 1 wherein said index carrier contains magnetically coded tracks and said pick-up elements comprise Hall effect generators.

4. The invention according to claim 3 wherein said means for obtaining said inverse comprises means for reversing the control voltage to said Hall effect generators.

* * * * *